United States Patent
Kusmiss

Patent Number: 5,669,124
Date of Patent: Sep. 23, 1997

[54] EYEGLASS HINGE PIN REPAIR KIT

[76] Inventor: John H. Kusmiss, 11160 Langmuir Ave., Sunland, Calif. 91040-2150

[21] Appl. No.: 607,910

[22] Filed: Mar. 21, 1996

Related U.S. Application Data

[63] Continuation of Ser. No. 132,310, Oct. 6, 1993, abandoned.

[51] Int. Cl.$^6$ .............................. B21D 33/00; G02C 5/22
[52] U.S. Cl. ................ 29/20; 29/402.01; 29/525.07; 16/228
[58] Field of Search .................. 16/222, 228, 385, 16/386; 351/153; 29/20, 402.01, 434, 525.06, 525.07

[56] References Cited

U.S. PATENT DOCUMENTS

| | | | |
|---|---|---|---|
| 3,546,735 | 12/1970 | Liautaud | 16/385 |
| 3,593,364 | 7/1971 | Liautaud . | |
| 3,762,266 | 10/1973 | Thellmann | 16/385 |
| 4,713,861 | 12/1987 | Bancroft | 16/222 |
| 5,224,248 | 7/1993 | Brilliant | 29/20 |

*Primary Examiner*—M. Rachuba
*Assistant Examiner*—Kenneth J. Hansen

[57] ABSTRACT

A kit for repairing an eyeglass frame that has lost a hinge pin comprises a container with at least one hinge pin therein, the hinge pin being locally plastically deformable at one end thereof, and instructions for installing the hinge pin in the frame. The replacement hinge pin is deformable either by softening or melting with a small flame or other heat source, or alternatively has a soft end portion which is mechanically deformable. A user of the kit deforms a first end of the pin to form a first end with a diameter greater than the maximum body diameter of the hinge pin, inserts the pin into a hinge of the eyeglass frame, and then deforms a second end of the pin to form a second end with a diameter greater than the maximum body diameter of the hinge pin, so that an earpiece of the frame becomes pivotally secured by the pin.

6 Claims, 4 Drawing Sheets

EYEGLASS HINGE PIN REPAIR KIT

This application is a continuation of application Ser. No. 08/132,310, filed Oct. 6, 1993, now abandoned.

BACKGROUND OF THE INVENTION

1. Field of the Invention

This invention relates to devices and methods for the repair of eyeglass frames by hinge pin replacement, and in particular to a kit for making such repair.

2. Description of the Prior Art

A perennial problem with eyeglass frames is that the hinge pins, which are normally threaded, tend to work loose and get lost, resulting in an unwearable frame. Conventional repair kits furnish similar threaded hinge pins or screws and a small screwdriver for installing them.

The length, diameter, and type of thread on the hinge pin can all vary, so that there is first of all a problem with matching the original hinge pin. Even if a perfect match is obtained, however, the hinge pins, being tiny, are difficult to handle and to install.

Generally, the installer, whose eyesight is not very good without her glasses, manages to drop the replacement pin at least once and is forced to crawl around on the floor searching for it. Finally, even a successful replacement operation merely staves off the day when the pin works loose again and the whole process has to be repeated.

SUMMARY OF THE INVENTION

In view of the problems traditionally associated with eyeglass frame hinge pins, it is an object of this invention to provide a novel and improved kit for replacing such pins with a minimum of trouble and increasing the mean free time against failure of the hinge.

In a first embodiment the invention comprises a container, at least one hinge pin in the container, the hinge pin being locally plastically deformable at one end thereof, and instructions for installing the hinge pin in the frame. One type of replacement hinge pin is deformable by softening or melting with a small flame or other heat source. Another type has a soft end portion which is mechanically deformable.

In the case of the first type of hinge pin, which can be a plastic material such as nylon, the instructions comprise text and/or pictures informing a user of the kit to melt a first end of the pin to form a first deformed end with a diameter greater than the maximum diameter of the hinge pin, insert the pin into a hinge of the eyeglass frame, and then melt a second end of the pin to form a second deformed end with a diameter greater than the maximum diameter of the hinge pin, whereby the earpiece becomes pivotally secured by the pin.

A second embodiment of the hinge pin has a first end with a diameter larger than a largest diameter of a body of the pin and the pin is locally deformable at a second end thereof by the application of heat or mechanical stress. In this case the instructions for installing the hinge pin in the frame include text and/or pictures instructing a user of the kit to insert the pin into a hinge of the eyeglass frame, and then to melt or mechanically stress a second end of the pin to form a second end with a diameter greater than the maximum body diameter of the hinge pin, whereby the earpiece becomes pivotally secured by the pin.

A third embodiment of the hinge pin has a first end with a diameter larger than a largest diameter of a body of the pin and further has a handling tab attached to the first end, the pin again being locally deformable at a second end thereof. In this case the instructions for installing the hinge pin in the frame comprise text and/or pictures instructing a user of the kit to insert the pin into a hinge of the eyeglass frame; to soften, melt, or mechanically deform a second end of the pin to form a second end with a diameter greater than the maximum body diameter of the hinge pin, whereby the earpiece becomes pivotally secured by the pin, and then to break off or otherwise remove the tab.

A first possibility for the tab is a frangibly attached, generally flat, thin member that is easily grasped by a thumb and forefinger. A second possibility for the tab is a series of connected identical hinge pins which are easily separated.

These and other features and advantages of the invention will be apparent to those skilled in the art to which this invention pertains, from the following detailed description of preferred embodiments, taken together with the accompanying drawings, in which:

DETAILED DESCRIPTION OF PREFERRED EMBODIMENTS

Figure 1:
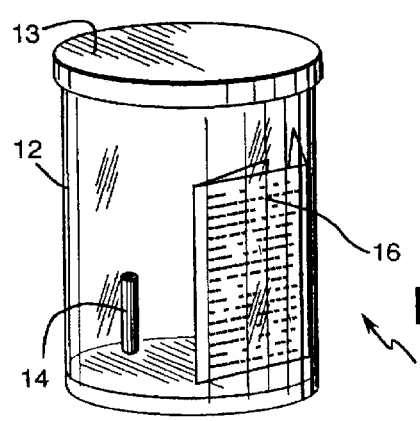
FIG. 1 is a perspective view of the eyeglass hinge pin repair kit of the invention.

Referring to FIG. 1, a kit 10 for repairing an eyeglass frame missing a hinge pin comprises a container 12, at least one hinge pin 14 in the container, and instructions 16 for installing the hinge pin in the frame. Container 12 can be any type such as is commonly used to package small amounts of material. The type shown in FIG. 1 is cylindrical and made of transparent plastic with a cap 13. The instructions 16 can be inside container 12 or form part of a label for the kit.

The hinge pin 14 is locally plastically deformable at a first end thereof, either by application of a small flame or other heat source, or by application of mechanical stress. Pin 14 has a maximum diameter small enough to fit in a hinge bore of the eyeglass frame. Instructions 16 comprise text alone or text and/or pictures informing a user of the kit how to install pin 14 in the eyeglass frame.

Figure 2:
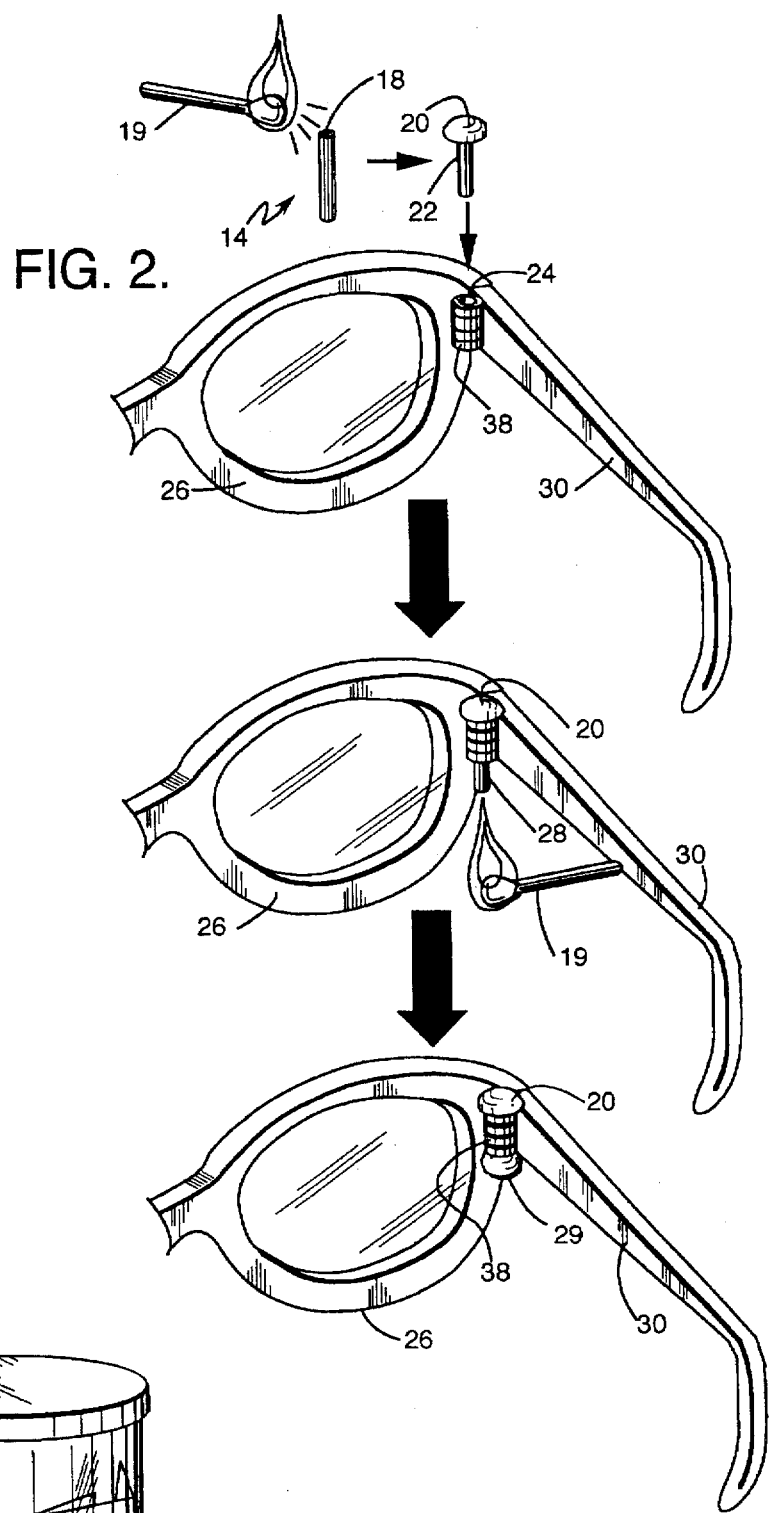
FIG. 2 shows an alternative embodiment of the replacement hinge pin and how to install it in an eyeglass frame (partly broken away) with arrows indicating the temporal sequence of events.

As illustrated by FIG. 2, for a locally meltable or softenable pin 14 the text of instructions 16 will instruct the user to melt a first end 18 of the pin with a heat source 19 to form a first deformed end 20 with a diameter greater than the maximum diameter of a body 22 of the hinge pin, insert the pin 14 into a hinge bore 24 of the eyeglass frame 26, and then melt or soften a second end 28 of the pin to form a second deformed end 29 with a diameter greater than the maximum diameter of body 22 of the hinge pin 14, whereby an earpiece 30 is pivotally secured by the pin 14.

Although the body portion 22 of hinge pin 14 is shown as cylindrical in FIG. 2, it can have any arbitrary shape provided that its maximum diameter is small enough to clear the inside diameter of hinge bore 24. Hinge pin 14 can be of a plastic material with a softening or melting temperature range that can be attained with a small flame or other heat source.

If plastic, pin 14 could be monofilament nylon, for example, such as is commonly used for sport fishing or in weed trimming machines. However, any plastic material that has a fairly low melting point or softening temperature and that is not too soft or brittle could be used.

Figure 3:
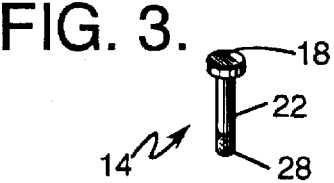
FIG. 3 is a perspective drawing of another alternative embodiment of the hinge pin.

With a plastic replacement pin, the heat source 19 is applied locally to deform an end of pin 14 into a shape having a diameter larger than the diameter of hinge bore Alternatively, as shown in FIG. 3, pin 14 can have a first end and body 22 made of a metal such as brass, with a second end comprising a softer metallic material that is easily mechanically deformed, such as an alloy of tin and lead, attached to body by soldering, for example.

Figure 4:
FIG. 4 is a perspective drawing of another alternative embodiment of the hinge pin.
Figure 5:
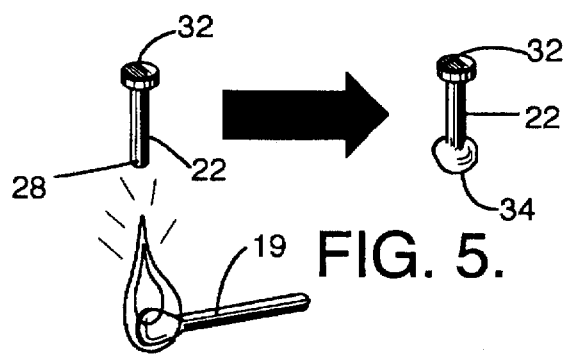
FIG. 5 is a perspective drawing of the hinge pin embodiment of FIG. 4 before and after the smaller end is deformed by a small heat source.
Figure 6:
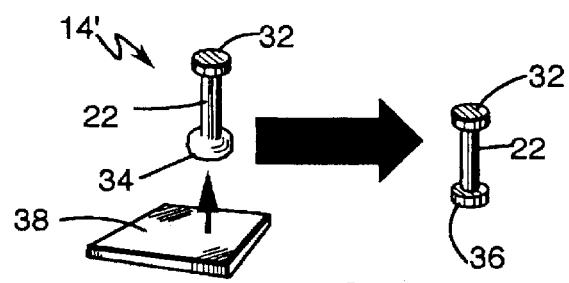
FIG. 6 shows how a heat-softened bulbous end of the hinge pin of FIG. 5 can be flattened by a cool, hard, flat surface.

An alternative embodiment of the hinge pin 14', is depicted in FIG. 4, having a first end 32 with a diameter larger than a largest diameter of body 22 of the pin. Again, pin 14' is locally deformable at one end by application of a small flame or other heat source, and/or by mechanical stress. As shown in FIG. 5, the deformable end 28 is softened or melted by heat into a bulbous shape 34 (for clarity frame 26 and earpiece 30 are not shown). If desired, a flattened shape 36 can be attained as shown in FIG. 6 by momentarily pressing a flat, cooler surface 38 against softened or melted bulbous shape 34.

Figure 7:
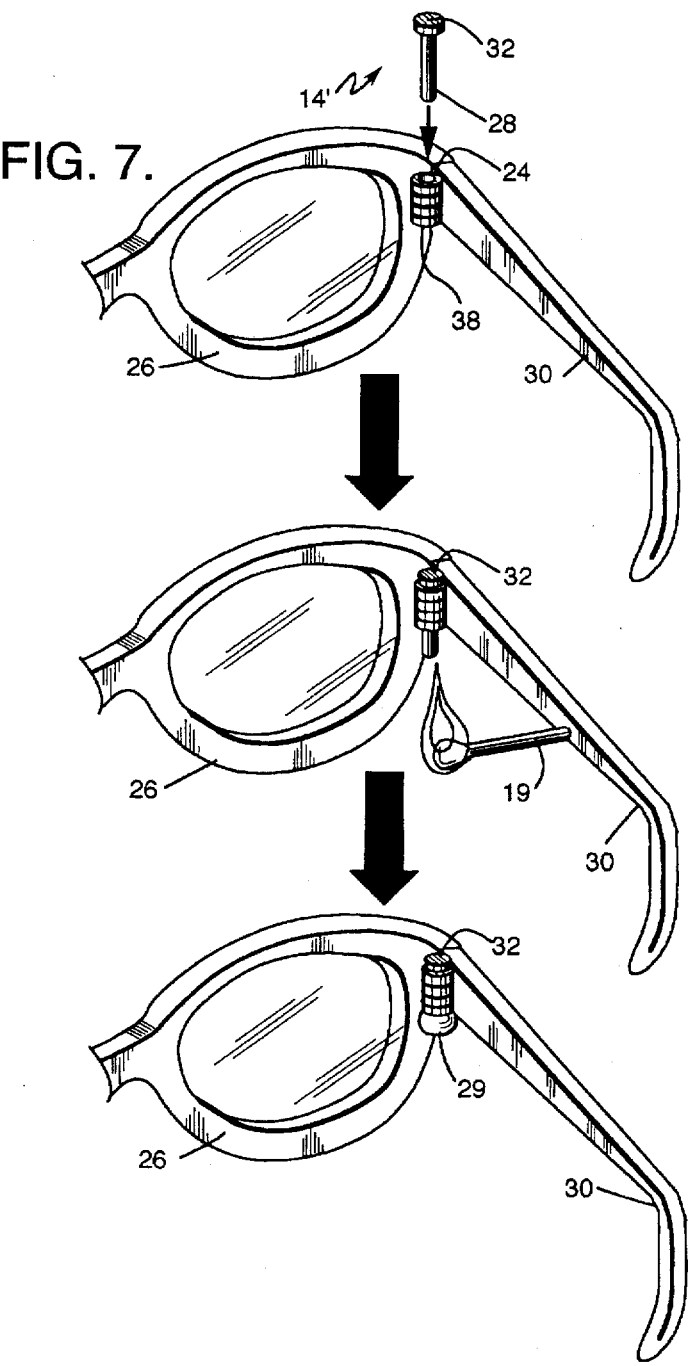
FIG. 7 is a perspective drawing showing how to install the hinge pin of FIG. 4 in an eyeglass frame (partly broken away).

The exact shape of first end 32 is immaterial provided it has a maximum diameter larger than the inner diameter of hinge 38. As illustrated by FIG. 7, in this embodiment the instructions comprise text, pictures, or text and pictures instructing a user of the kit to insert the second, smaller end 28 of the pin 14' into bore 24 of hinge 38 of the eyeglass frame 26, and then to deform the second end 28 of the pin to form a second deformed end 29 with a diameter greater than the maximum body diameter of hinge pin 14', whereby the earpiece 30 is pivotally secured by pin 14'.

Figure 8:
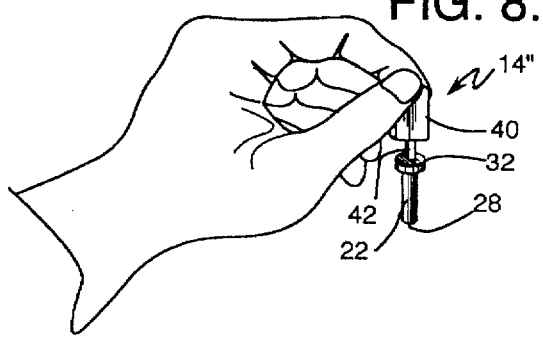
FIG. 8 is a perspective drawing of another alternative embodiment of the hinge pin, featuring a handling tab.

In another alternative embodiment of the hinge pin 14", shown in FIG. 8, it has a first end 32 with a diameter larger than a largest diameter of the body 22 of the pin, a handling tab 40 attached by a member 42 to first end 32, and a second end 28 which is locally deformable, either by application of a small flame or other heat source, or by peening or crushing with a hard object.

Figures 9, 10:
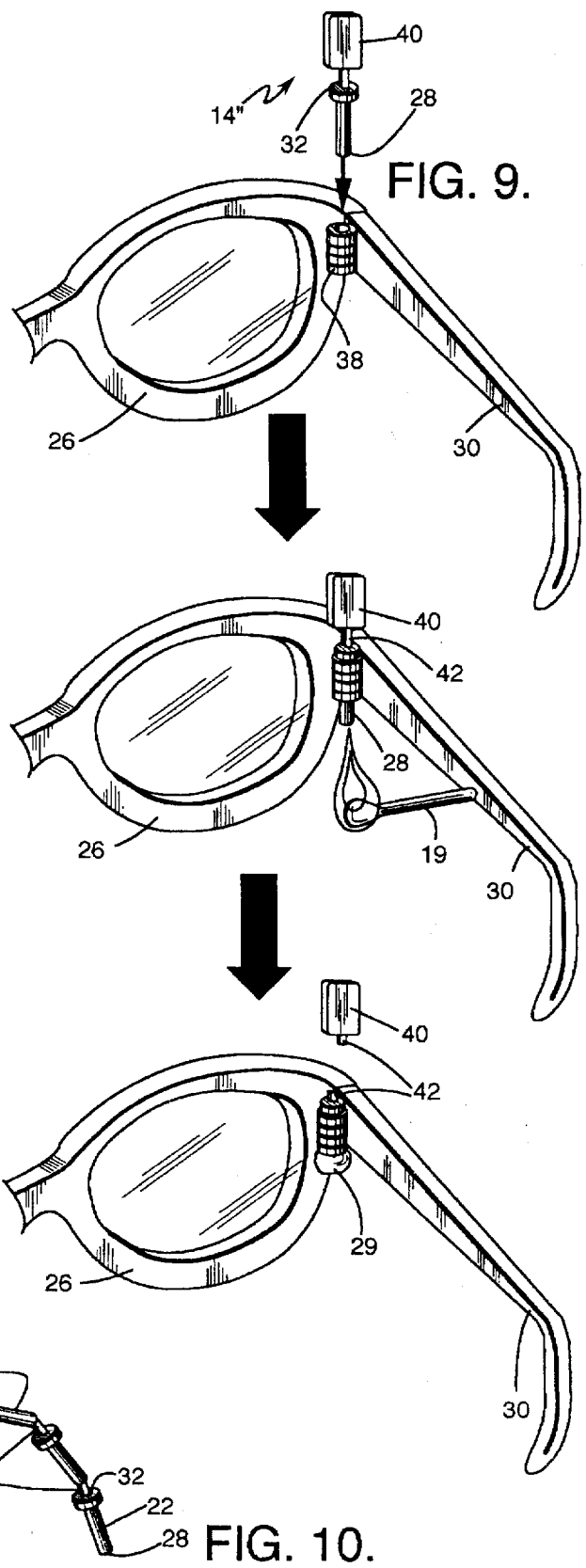
FIG. 9 is a perspective drawing showing how to install the hinge pin of FIG. 8 in an eyeglass frame (partly broken away).
FIG. 10 is a perspective drawing of a variation of the hinge pin of FIG. 8, in which the handling tab comprises a series of identical pins connected by easily separable connecting members.

In the case of the embodiment of FIG. 8, the instructions would comprise text or pictures or text and pictures informing a user of the kit to carry out the steps shown in FIG. 9. First end 32 of pin 14", is inserted into a hinge 38 of the eyeglass frame, second end 28 of the pin is deformed to form a second deformed end 29 with a diameter greater than the maximum body diameter of the hinge pin, and tab 40 is broken off or cut, whereby the earpiece 30 is pivotally secured by the pin 14".

The tab 40 can comprise a frangibly attached, generally flat, thin member that is easily grasped by a thumb and forefinger so that it is convenient to handle and manipulate. Alternatively, the tab 40 can comprise a-series of connected hinge pins 44, as shown in FIG. 10, with connecting members 46 being of a type that are easily broken or cut.

In all of the embodiments described above, it is important to match the body diameter of the replacement hinge pin to the inner bore of the hinge so that there is no excessive looseness in the operation of the hinge.

The advantages of the invention include simplicity and ease in repairing eyeglass frames that have lost a hinge pin, as well as the provision of a type of replacement hinge pin that will not work itself loose again.

Those having skill in the arts relevant to the present invention will undoubtedly think of various modifications or additions to the invention based upon the embodiments disclosed herein. For example, in the implementations of the hinge pin which are metallic and have a first end larger in diameter than the bore of the hinge, there could be other ways of deforming the second end of the pin after it is inserted into the hinge, such as simply bending over the second end to secure it in the bore. Therefore, it should be understood that the invention is not to be limited to the disclosed embodiments, but is to be limited only by the following claims.

I claim:

1. A method for repairing an eyeglass frame using a hinge pin having a first end with a diameter larger than a maximum diameter of a body of said pin, said maximum diameter being small enough to just fit in a hinge bore of said eyeglass frame, said hinge pin being plastically deformable by application of heat at a second end thereof, comprising the steps of:

inserting said pin into a hinge of said eyeglass frame, and deforming said second end of said pin by heating to form a second deformed end with a diameter greater than said maximum diameter of said body of said hinge pin, wherein an earpiece of said frame becomes pivotally secured by said pin.

2. The method of claim 1 further comprising the step of momentarily pressing a cooler object against said second deformed end before said deformed end has hardened, to form a flattened shape of said deformed end.

3. A method for repairing an eyeglass frame by using a hinge pin which is plastically deformable at first and second ends thereof by application of heat and has a maximum diameter small enough to just fit in a hinge bore of said eyeglass frame, comprising the steps of:

deforming said first end of said pin by heating to form a first deformed end with a diameter greater than said maximum diameter of said hinge pin, inserting said pin into a hinge of said eyeglass frame, and deforming said second end of said pin by heating to form a second deformed end with a diameter greater than said maximum diameter of said hinge pin, wherein an earpiece of said frame becomes pivotally secured by said pin.

4. The method of claim 3 further comprising the step of momentarily pressing a cooler object against said second deformed end before said deformed end has hardened, to form a flattened shape of said deformed end.

5. A method for repairing an eyeglass frame using a hinge pin having a first end with a diameter larger than a largest diameter of a body of said pin, said largest diameter of said body of said hinge pin being small enough to just fit in a hinge bore of said eyeglass frame, said pin further having a handling tab attached to said first end, and said pin being plastically deformable by application of heat at a second end thereof, comprising the steps of:

inserting said pin into a hinge of said eyeglass frame, deforming said second end of said pin by heating to form a second deformed end with a diameter greater than said largest diameter of said body of said hinge pin, wherein an earpiece of said frame becomes pivotally secured by said pin, and separating said tab from said first end of said pin.

6. The method of claim 5 further comprising the step of momentarily pressing a cooler object against said second deformed end before said deformed end has hardened, to form a flattened shape of said deformed end.

* * * * *